(12) United States Patent
Feris et al.

(10) Patent No.: US 8,934,714 B2
(45) Date of Patent: *Jan. 13, 2015

(54) FOREGROUND ANALYSIS BASED ON TRACKING INFORMATION

(71) Applicant: International Business Machines Corporation, Armonk, NY (US)

(72) Inventors: Rogerio S. Feris, White Plains, NY (US); Arun Hampapur, Norwalk, CT (US); Frederik C. Kjeldsen, Poughkeepsie, NY (US); Hao-Wei Liu, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,629

(22) Filed: May 6, 2013

(65) Prior Publication Data

US 2013/0243254 A1    Sep. 19, 2013

Related U.S. Application Data

(63) Continuation of application No. 12/844,330, filed on Jul. 27, 2010, now Pat. No. 8,483,481.

(51) Int. Cl.
*G06K 9/34* (2006.01)
*G06K 9/00* (2006.01)

(52) U.S. Cl.
CPC ........ *G06K 9/00771* (2013.01); *G06K 9/00744* (2013.01)
USPC ............................. 382/173; 382/176; 382/190

(58) Field of Classification Search
USPC ......... 382/110, 173, 103, 164, 128, 190, 199, 382/305, 176; 358/403, 1.15; 424/277.1; 705/400; 356/326, 328; 235/383

See application file for complete search history.

(56) References Cited

U.S. PATENT DOCUMENTS

| | | | |
|---|---|---|---|
| 7,418,134 B2* | 8/2008 | Schwartz et al. | 382/173 |
| 7,558,404 B2* | 7/2009 | Ma et al. | 382/103 |
| 7,567,702 B2* | 7/2009 | Woodfill et al. | 382/154 |
| 7,620,266 B2 | 11/2009 | Brown et al. | |
| 7,916,944 B2* | 3/2011 | Yang et al. | 382/173 |
| 7,925,077 B2 | 4/2011 | Woodfill et al. | |

(Continued)

FOREIGN PATENT DOCUMENTS

| | | |
|---|---|---|
| WO | 2008008045 | 1/2008 |
| WO | 2009031751 | 3/2009 |
| WO | 2009066994 | 5/2009 |

OTHER PUBLICATIONS

Lindsay et al., RFID Locating Systems for Linking Valued Objects with Multimedia Files. IPCOM21113D. 2003, pp. 1-10.

(Continued)

*Primary Examiner* — Anh Do
(74) *Attorney, Agent, or Firm* — Ryan, Mason & Lewis, LLP

(57) ABSTRACT

Techniques for performing foreground analysis are provided. The techniques include identifying a region of interest in a video scene, detecting a static foreground object in the region of interest, and determining whether the static foreground object is abandoned or removed, wherein said determining comprises performing a foreground analysis based on tracking information and pruning one or more false alarms using one or more track statistics.

20 Claims, 4 Drawing Sheets

(56) References Cited

U.S. PATENT DOCUMENTS

| | | | |
|---|---|---|---|
| 8,107,678 B2* | 1/2012 | Feris et al. | 382/103 |
| 8,284,249 B2* | 10/2012 | Feris et al. | 348/143 |
| 8,483,481 B2* | 7/2013 | Feris et al. | 382/173 |
| 2004/0131254 A1 | 7/2004 | Liang et al. | |
| 2008/0018738 A1 | 1/2008 | Lipton et al. | |
| 2008/0181499 A1 | 7/2008 | Yang et al. | |
| 2008/0226172 A1 | 9/2008 | Connell | |
| 2008/0247599 A1 | 10/2008 | Porikli et al. | |
| 2009/0034797 A1 | 2/2009 | Senior | |
| 2009/0110236 A1 | 4/2009 | Huang et al. | |
| 2009/0238462 A1 | 9/2009 | Feris et al. | |
| 2009/0244390 A1 | 10/2009 | Feris et al. | |

OTHER PUBLICATIONS

System and Method to Enrich Images with Semantic Data, IPCOM156656D. 2007, pp. 1-10.

Tian et al., Real-Time Detection of Abandoned and Removed Objects in Complex Environments, Sep. 30, 2008, pp. 1-8.

Audivet et al., Left-Luggage Detection Using Homographies and Simple Heuristics, in PETS, 2006, pp. 51-58.

Beynon et al., Detecting Abandoned Packages in a Multi-Camera Video Surveillance System, IEEE International Conference on Advanced Video and Signal-Based Surveillance, 2003, pp. 1-8.

Connell et al., Detection and Tracking in the IBM PeopleVision System, in IEEE ICME, Jun. 2004, pp. 1-4.

Krahnstoever et al., Multiview Detection and Tracking of Travelers and Luggage in Mass Transit Environments, in PETS, 2006, pp. 67-74.

Martinez-Del-Rincon et al., Automatic Left Luggage Detection and Tracking using Multi Cameras, in PETS, 2006, pp. 59-66.

Guler et al., Stationary Objects in Multiple Object Tracking, IEEE International Conference on Advance Video and Signal-Based Surveillance, London, UK, Sep. 2007, pp. 248-253.

Smith et al., Detecting Abandoned Luggage Items in a Public Space, in PETS, 2006, pp. 75-82.

Stauffer et al., Adaptive Background Mixture Models for Real-Time Tracking, 1999 IEEE, pp. 246-252.

Brown, View Independent Vehicle/Person Classification, VSSN'04, Oct. 15, 2004, New York, New York, USA, pp. 1-10.

Tian et al., Robust and Efficient Foreground Analysis for Real-time Video Surveillance, Proceedings of the 2005 IEEE Computer Society Conference on Computer Vision and Pattern Recognition (CVPR'05), pp. 1-6.

Lindsay et al., Improved Wearable Sensor Systems, IPCOM30041D, 2004, pp. 1-20.

Jouet et al., Tracking Method Using Infrared Pictures, INCOM146207D, Feb. 7, 2007, pp. 1-3.

Lindsay et al., Retail RFID Systems without Smart Shelves, IPCOM21114D, 2003, pp. 1-9.

Reade et al., RFID Systems for Enhanced Shopping Experiences, IPCOM21115D, 2003, pp. 1-12.

Sacchi et al., A Distributed Surveillance System for Detection of Abandoned Objects in Unmanned Railway Environments, IEEE Transactions on Vehicular Technology, vol. 49, No. 5, Sep. 2000, pp. 2013-2026.

* cited by examiner

FOREGROUND ANALYSIS BASED ON TRACKING INFORMATION

CROSS-REFERENCE TO RELATED APPLICATIONS

This application is a continuation of U.S. patent application Ser. No. 12/844,330, filed Jul. 27, 2010, now U.S. Pat. No. 8,483,481 which is incorporated by reference herein.

The present application is related to U.S. patent application Ser. No. 12/053,827, entitled "Detection of Abandoned and Removed Objects in a Video Stream," filed on Mar. 24, 2008, now U.S. Pat. No. 8,107,678 the disclosure of which is incorporated by reference herein in its entirety.

The present application is also related to U.S. patent application Ser. No. 12/054,717, entitled "Real Time Processing of Video Frames for Triggering an Alert," filed on Mar. 25, 2008, now U.S. Pat. No. 8,284,249, the disclosure of which is incorporated by reference herein in its entirety.

FIELD OF THE INVENTION

Embodiments of the invention generally relate to information technology, and, more particularly, to video surveillance.

BACKGROUND OF THE INVENTION

In surveillance systems, background subtraction techniques have been used to detect foreground objects in a scene. For example, abandoned objects and parked car detection algorithms can rely on background subtraction to detect candidate foreground objects that are static for some given period of time. A candidate foreground object may be created when a new object enters the scene (for example, a car entering the camera field-of-view) or when an object is removed from the background (for example, a parked car leaving). Existing approaches rely on edge energy methods, which are sensitive to background clutter.

SUMMARY OF THE INVENTION

Principles and embodiments of the invention provide techniques for foreground analysis based on tracking information. An exemplary method (which may be computer-implemented) for performing foreground analysis, according to one aspect of the invention, can include steps of identifying a region of interest in a video scene, detecting a static foreground object in the region of interest, and determining whether the static foreground object is abandoned or removed, wherein said determining comprises performing a foreground analysis based on tracking information and pruning one or more false alarms using one or more track statistics.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
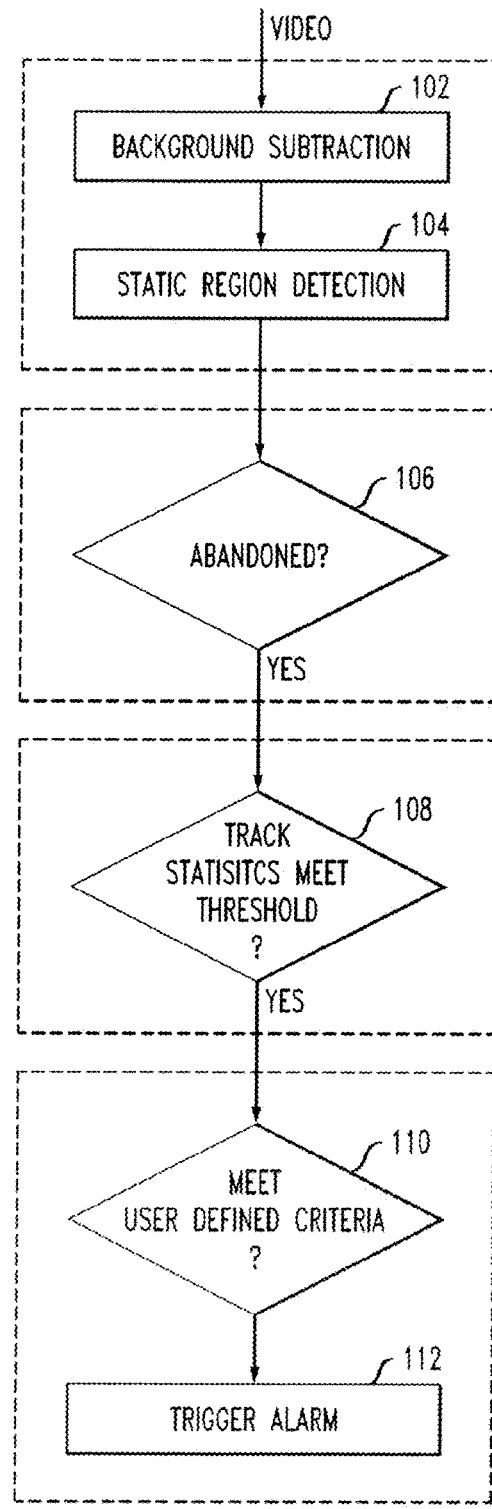
FIG. 1 is a block diagram illustrating an exemplary embodiment, according to an aspect of the invention.

Principles of the invention include foreground analysis (for example, detecting whether an object is abandoned or removed from a background) based on tracking information. As described herein, one or more embodiments of the invention can include analyzing static foreground blobs to decide whether they are abandoned to trigger, for example, a parked car alert, or removed from the background.

By way of illustration and not limitation, consider the example of parked cars. In one or more embodiments of the invention, a user first manually draws a region of interest in the scene where cars may be parked. Background subtraction and object tracking algorithms are applied and tracking can be performed inside the region of interest provided by the user. In one or more embodiments of the invention, both the background subtraction and object tracking modules are commonly available low-level modules in any surveillance. The two modules pre-process the incoming video and provide processed results to higher level modules (for example, higher level modules that interact with the users). For example, given a background frame $F_b$ and an incoming frame $F_t$ at time instance t, the background subtraction module detects candidate foreground objects $O_1, O_2, \ldots O_n$ by subtracting $F_b$ from $F_t$ and sends $O_i$ for further analysis. From the background subtraction module, one or more embodiments of the invention can include detecting static foreground objects, which are $O_i$s that are stationary for a user defined time threshold $t_{static}$.

The background subtraction also includes the functionality for distinguishing whether the static region is abandoned or removed, a process referred to herein as heal type classification. Accordingly, the end users can issue queries exclusively for abandoned cases (for example, which are the newly arriving cars in the past four hours) or removed ones (for example, which are the cars that left in the past four hours). To accomplish this, the module runs foreground analysis based on edge energy and region growing tuned to give very low false negatives (that is, if the object is abandoned, it will most likely classify it correctly), but potentially with more false alarms (that is, removed objects may be classified as abandoned).

In one or more embodiments of the invention, the foreground analysis techniques can either assume a highly textured foreground object or one with a distinctive color distribution. Based on these assumptions, candidate foreground objects can be classified as abandoned or removed by measuring the change in edge energy (the highly textured assumption) or in color distribution using region growing (the highly distinctive color assumption). Additionally, one or more embodiments of the invention can include pruning the false alarms from the previous stage using track statistics from the object tracking algorithm.

As detailed herein, an object tracking system is a commonly available module in a surveillance system. It tracks and monitors every possible moving object and provides statistics to possibly higher-level modules or the users for further analysis. The object tracking system accomplishes this by gathering the output from the background subtraction module (that is, the $O_i$s), aggregating that output from the beginning of the observation session up to the current time instance T, and forming trajectories for each $O_i$ by establishing correspondences between them. The correspondences are established by cross matching these $O_i$s, assuming the color distribution of an object is similar across different time instances. These track statistics include, but are not limited to, for example, velocity, moving direction, location at each time instance of all the moving objects, etc.

Accordingly, the techniques detailed herein can advantageously make use of tracking to decide whether a foreground blob is removed or abandoned. If the object is abandoned, one or more embodiments of the invention include determining whether the object meets some user-defined criteria and trigger the parked car detection alarm. For example, in parked car detection applications, these criteria could include the speed limitation of the object or smoothness of the object trajectories, assuming that the motion of a car is slow and regular in a parking lot. Also, in one or more embodiments of the invention, track statistics are used to verify or reject the heal type detection produced by the background subtraction module.

FIG. 1 is a block diagram illustrating an exemplary embodiment, according to an aspect of the invention. By way of illustration, FIG. 1 depicts an input video feed to which a background subtraction module 102 and a static region detection module 104 are applied. The background subtraction module 102 averages the first few frames of the input video to construct a background frame $F_b$, and for every incoming frame afterwards $F_t$, the background subtraction module 102 detects candidate foreground objects $O_1, O_2, \ldots O_n$ by subtracting $F_b$ from $F_t$. At each time instance t, given $O_1, O_2, \ldots O_n$ from background subtraction module 102, static region detection module 104 detects static regions among them by checking which ones are stationary for a user defined threshold $t_{static}$.

Given static regions $R_1, R_2, \ldots R_n$ from module 104, the abandoned determination module 106 is then used to determine whether an object in the video feed is abandoned (or, for example, removed). The abandoned determination module 106 accomplishes this by running both the foreground analysis techniques, that is, the edge energy or region growing methods. If the object is determined to be abandoned, a statistics tracking module 108 is used to determine if the tracked statistics meet a user-defined threshold to further verify the detections made by abandoned determination module 106. If the tracked statistics meet the threshold, a criteria module 110 is used to determine if other user-defined criterion are met, and if so, an alarm module 112 triggers an alarm and displays a red warning box around the detected abandoned object.

In some complex scenarios of video surveillance, the false alarm rate could be high because of varying lighting, crowded traffic, cluttered background, weather condition, etc. In order to maintain the detection rate and decrease the false-positive rate, one or more embodiments of the invention can include employing an additional module by using tracking information. Incorporating track information improves the performance with a large margin, as it allows users to incorporate more context information. By way of example, genuine abandoned objects, for instance, parked vehicles, typically come into a parked space with clear trajectories, while false alarms, for instance, due to random lighting variations do not associate with regular and smooth trajectories. As such, instead of triggering an alarm relying only on the heal-type detection and matching process, one or more embodiments of the invention include combining the algorithm detailed herein using a tracking algorithm to further reduce the false-alarm rate. Given the detection results (either abandoned or removed) from the background subtraction module, the module uses the tracking statistics associated with the detection results to further reduce the false alarm by checking if those statistic meet user defined thresholds.

After detecting a candidate abandoned object, one or more embodiments of the invention can further verify the detection using a tracker as follows (although, for example, any tracking algorithm can be used). The tracker tracks all of the moving objects and produces corresponding trajectories. One or more embodiments of the invention include querying the tracker with the detected abandoned object in order to retrieve the trajectories associated therewith. Let v be the speed of the tracked object computed from its trajectory over a period of W frames up to the current frame, and let bCross be a Boolean variable indicating whether the trajectory intersects the boundary of the region of interest. An alarm is triggered if bCross=true and v>=SpeedThr, and the candidate is rejected otherwise. W and SpeedThr are user controllable parameters. Accordingly, one or more embodiments of the invention include checking with the tracker to see if the candidate object (for example, a parked vehicle) comes from outside the region of interest and travels at a reasonable speed.

Advantageously, one or more embodiments of the invention can include using only tracking information to provide an additional cue to reduce the false-alarm rate. Instead of using long-term trajectories, which are usually unreliable under complex environments, one or more embodiments of the invention consider them in a small temporal window and use them only as some of the criteria for the abandoned object detection, reducing the impact of spurious and noisy trajectories.

To illustrate the effectiveness of leveraging tracking information, comparisons were made of the performances of a system (as described herein with and without using the tracking algorithm. The evaluations were done, for example, in a big city to detect illegally parked vehicles under complex environments where lighting varies from bright day-time to fluorescent night-time, weather ranging from sunny to raining, and camera angles from frontal to profile. The region of interest was set to the area where parking is not allowed, and the sizes of abandoned objects were set to 500 pixels and the abandoned time set to five minutes.

Figure 2:
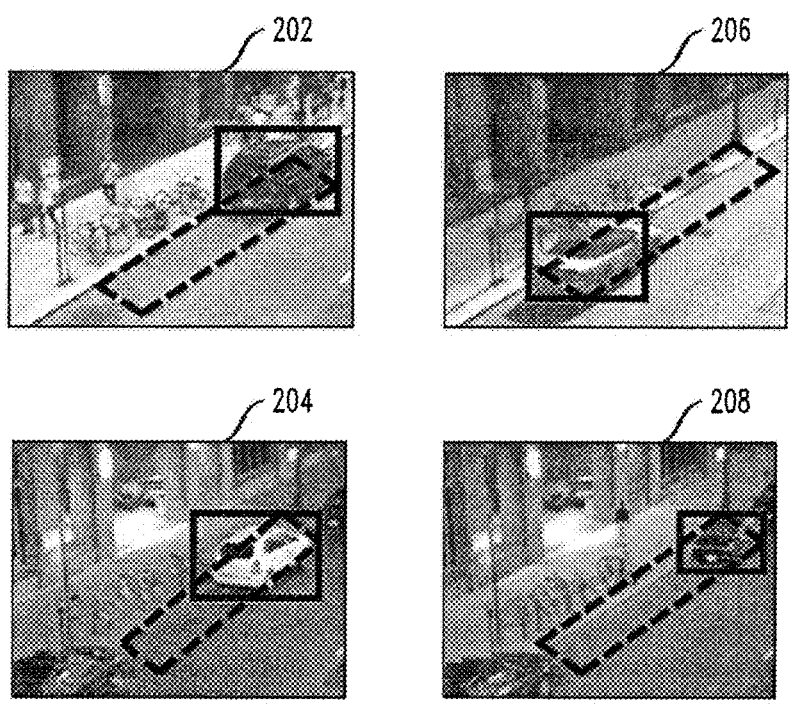
FIG. 2 is a diagram illustrating example video images, according to an embodiment of the present invention.

With the comparison of the parked vehicle detection results on video sequences of 53 hours long in total, the false-alarm rate was reduced from 44.5% to 20.7%, a ~25% reduction by incorporating the trajectories. The improvement is even more significant during night-time where the interplay between the headlights of vehicles and street lights causes more false positives. FIG. 2 shows examples of detected parked vehicles under different lighting conditions.

FIG. 2 is a diagram illustrating example video images, according to an embodiment of the present invention. By way of illustration, FIG. 2 depicts image 202, image 204, image 206 and image 208. The group of four images depicts the final results of one or more embodiments of the invention. The dashed rectangles are a user-defined "Region of Interest" for monitoring. The solid rectangles enclose detected parked cars (that is, abandoned objects) that are stationary for a user-defined time.

Figure 3:
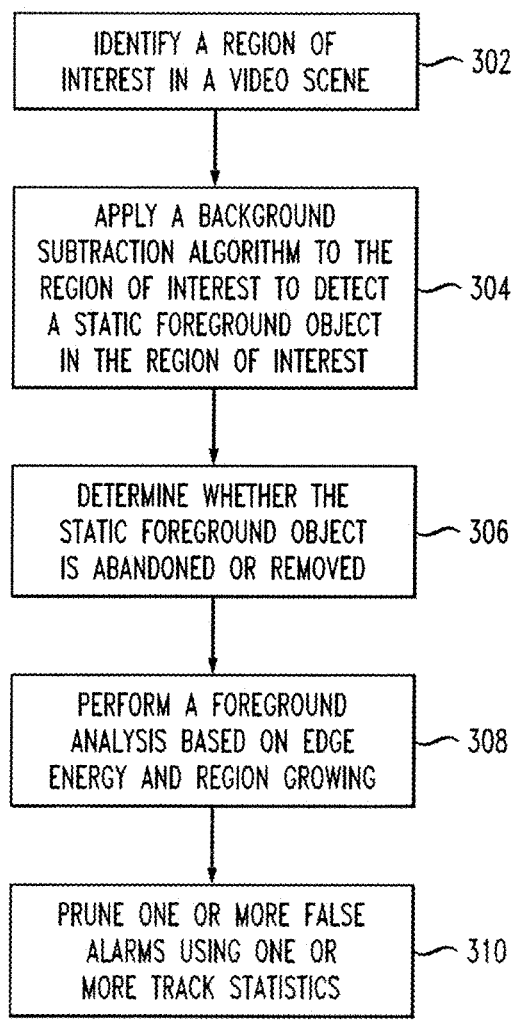
FIG. 3 is a flow diagram illustrating techniques for performing foreground analysis, according to an embodiment of the invention.

FIG. 3 is a flow diagram illustrating techniques for performing foreground analysis, according to an embodiment of the present invention. Step 302 includes identifying a region of interest in a video scene. In one or more embodiments of the invention, identifying a region of interest in a video scene can include enabling a user to manually draw a region of interest in a video scene.

Step 304 includes applying a background subtraction algorithm to the region of interest to detect a static foreground object in the region of interest. This step can be carried out, for example, using a background subtraction module. Step 306 includes determining whether the static foreground object is abandoned or removed. This step can be carried out, for example, using a static region detection module. Determining whether the static foreground object is abandoned or removed can include steps 308 and 310.

Step 308 includes performing a foreground analysis based on edge energy and region growing (for example, tuned to give very low false negatives). This step can be carried out, for example, using an abandoned determination module. Step 310 includes pruning one or more false alarms using one or more track statistics (for example, velocity, moving direction, etc.). This step can be carried out, for example, using a statistics tracking module. Pruning false alarms using one or more track statistics can include using information from an object tracking algorithm.

The techniques depicted in FIG. 3 can also include determining whether a static foreground object determined to be abandoned meets user-defined criteria. For example, in the parked car detection applications, the users (for example, police officers) could issue queries such as, "Retrieve all the cars parked in illegal parking area A for at least 30 minutes." Additionally, one or more embodiments of the invention include triggering an alarm if the static foreground object determined to be abandoned meets the user-defined criteria. The techniques depicted in FIG. 3 can further include verifying the detection of a static foreground object determined to be abandoned using a tracker.

Using a tracker to verify the detection of a static foreground object determined to be abandoned can include using the tracker to track each of one or more moving objects in the region of interest to produce one or more corresponding trajectories, and querying the tracker with the static foreground object determined to be abandoned to retrieve one or more trajectories associated therewith. One or more embodiments of the invention also include using the tracker to determine if the static foreground object determined to be abandoned entered from outside the region of interest and travelled within a pre-determined range of speed. Additionally, one or more embodiments of the invention include using v to represent speed of the object computed from its trajectory over a period of W frames up to a current frame, and using bCross as a Boolean variable indicating whether the trajectory intersects a boundary of the region of interest, wherein an alarm is triggered if bCross=true and v≥SpeedThr, a user defined threshold, and wherein the object is rejected as a candidate otherwise.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a background subtraction module, a static region detection module, an abandoned determination module, a statistics tracking module 108, a criteria module 110 and an alarm module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
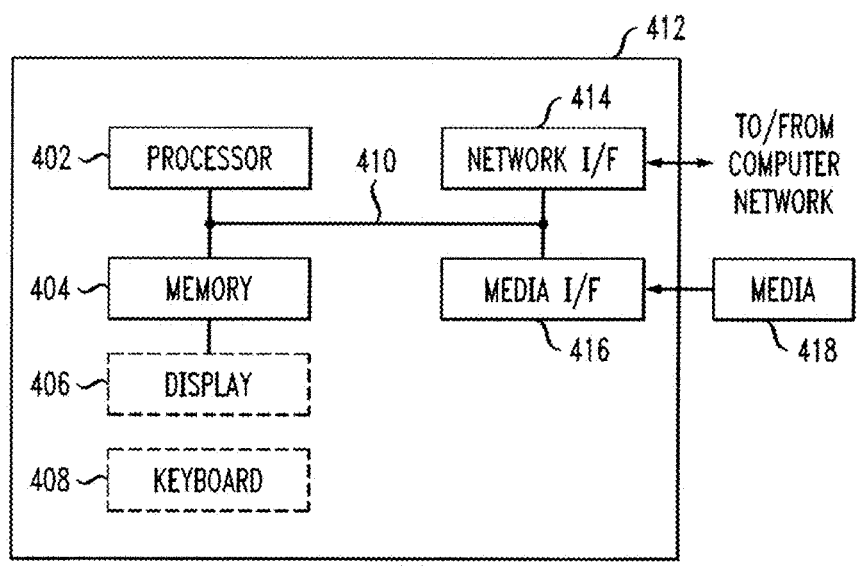
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, tracking to decide whether a foreground blob is removed or abandoned.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for performing foreground analysis, wherein the method comprises:
    identifying a region of interest in a video scene, said identifying carried out by a distinct module executing on a hardware processor;
    detecting a static foreground object in the region of interest, said detecting carried out by a distinct module executing on a hardware processor; and
    determining whether the static foreground object is abandoned or removed, wherein said determining comprises performing a foreground analysis based on tracking information and pruning one or more false alarms using one or more track statistics, said determining carried out by a distinct module executing on a hardware processor.

2. The method of claim 1, wherein identifying a region of interest in a video scene comprises enabling a user to manually draw a region of interest in a video scene.

3. The method of claim 1, wherein pruning one or more false alarms using one or more track statistics comprises using information from an object tracking algorithm.

4. The method of claim 1, further comprising determining whether a static foreground object determined to be abandoned meets user-defined criteria.

5. The method of claim 4, further comprising triggering an alarm if the static foreground object determined to be abandoned meets the user-defined criteria.

6. The method of claim 1, further comprising verifying the detection of a static foreground object determined to be abandoned using a tracker.

7. The method of claim 6, wherein using a tracker to verify the detection of a static foreground object determined to be abandoned comprises:
    using the tracker to track each of one or more moving objects in the region of interest to produce one or more corresponding trajectories; and
    querying the tracker with the static foreground object determined to be abandoned to retrieve one or more trajectories associated therewith.

8. The method of claim 7, further comprising using the tracker to determine if the static foreground object determined to be abandoned entered from outside the region of interest and travelled within a pre-determined range of speed.

9. The method of claim 8, further comprising using v to represent speed of the object computed from its trajectory over a period of W frames up to a current frame, and using bCross as a Boolean variable indicating whether the trajectory intersects a boundary of the region of interest, wherein an alarm is triggered if bCross=true and v≥SpeedThr, a user defined threshold, and wherein the object is rejected as a candidate otherwise.

10. The method of claim 1, wherein said detecting comprises applying a background subtraction algorithm to the region of interest to detect a static foreground object in the region of interest.

11. The method of claim 1, wherein said performing a foreground analysis based on tracking information comprises performing a foreground analysis based on edge energy and region growing.

12. A computer program product comprising a tangible computer readable recordable storage device including computer useable program code for performing foreground analysis, the computer program product including:
  identifying a region of interest in a video scene;
  detecting a static foreground object in the region of interest; and
  determining whether the static foreground object is abandoned or removed, wherein said determining comprises performing a foreground analysis based on tracking information and pruning one or more false alarms using one or more track statistics.

13. The computer program product of claim 12, wherein the computer useable program code for identifying a region of interest in a video scene comprises computer useable program code for enabling a user to manually draw a region of interest in a video scene.

14. The computer program product of claim 12, wherein the computer useable program code for pruning one or more false alarms using one or more track statistics comprises computer useable program code for using information from an object tracking algorithm.

15. The computer program product of claim 12, further comprising computer useable program code for verifying the detection of a static foreground object determined to be abandoned using a tracker.

16. The computer program product of claim 15, wherein the computer useable program code for using a tracker to verify the detection of a static foreground object determined to be abandoned comprises:
  computer useable program code for using the tracker to track each of one or more moving objects in the region of interest to produce one or more corresponding trajectories; and
  computer useable program code for querying the tracker with the static foreground object determined to be abandoned to retrieve one or more trajectories associated therewith.

17. The computer program product of claim 16, further comprising:
  computer useable program code for using the tracker to determine if the static foreground object determined to be abandoned entered from outside the region of interest and travelled within a pre-determined range of speed; and
  computer useable program code for using v to represent speed of the object computed from its trajectory over a period of W frames up to a current frame, and using bCross as a Boolean variable indicating whether the trajectory intersects a boundary of the region of interest, wherein an alarm is triggered if bCross=true and v≥SpeedThr, a user defined threshold, and wherein the object is rejected as a candidate otherwise.

18. The computer program product of claim 12, wherein said detecting comprises applying a background subtraction algorithm to the region of interest to detect a static foreground object in the region of interest.

19. The computer program product of claim 12, wherein said performing a foreground analysis based on tracking information comprises performing a foreground analysis based on edge energy and region growing.

20. A system for performing foreground analysis, comprising:
  a memory; and
  at least one processor coupled to the memory and operative to:
    identify a region of interest in a video scene;
    detect a static foreground object in the region of interest; and
    determine whether the static foreground object is abandoned or removed, wherein said determining comprises performing a foreground analysis based on tracking information and pruning one or more false alarms using one or more track statistics.

* * * * *